(12) United States Patent
Kamaraju et al.

(10) Patent No.: US 12,137,129 B2
(45) Date of Patent: Nov. 5, 2024

(54) UTILIZATION OF COMPUTE FOR A MEDIA SERVICE

(71) Applicant: STREEM, LLC, Portland, OR (US)

(72) Inventors: Pavan K. Kamaraju, Portland, OR (US); Steven Funasaki, Portland, OR (US); Renganathan Veerasubramanian, Portland, OR (US)

(73) Assignee: STREEM, LLC, Portland, OR (US)

( * ) Notice: Subject to any disclaimer, the term of this patent is extended or adjusted under 35 U.S.C. 154(b) by 67 days.

(21) Appl. No.: 17/885,662

(22) Filed: Aug. 11, 2022

(65) Prior Publication Data
US 2024/0056491 A1   Feb. 15, 2024

(51) Int. Cl.
*H04L 65/403* (2022.01)
*G06F 9/50* (2006.01)

(52) U.S. Cl.
CPC .......... *H04L 65/403* (2013.01); *G06F 9/5083* (2013.01)

(58) Field of Classification Search
CPC ............... H04L 65/403; H04L 65/4053; H04L 65/1063; H04L 65/60; H04L 65/75; H04L 67/61; H04L 69/40; H04L 12/1827; G06F 9/5083; G06F 9/5055; G06F 9/3851
See application file for complete search history.

(56) References Cited

U.S. PATENT DOCUMENTS

| | | | |
|---|---|---|---|
| 2019/0222621 A1* | 7/2019 | Kolan | H04L 67/10 |
| 2021/0320810 A1* | 10/2021 | Kolan | H04L 65/1016 |

* cited by examiner

*Primary Examiner* — Yogeshkumar Patel
(74) *Attorney, Agent, or Firm* — Schwabe Williamson & Wyatt

(57) ABSTRACT

Embodiments include systems and methods for offloading media service operation to one or graphical processing unit (GPUs). In some embodiments, a computer system, includes a first computer device to provide a media service that involves implementing media service operations and transmit a first media service request for a first media service operation of the media service operations. In addition, the computer system includes a second computer device that includes one or more GPUs. The second computer device is to implement the first media service operation with the one or more GPUs in response to the first computer device transmitting the first media service request for the first media service operation.

19 Claims, 6 Drawing Sheets

UTILIZATION OF COMPUTE FOR A MEDIA SERVICE

TECHNICAL FIELD

The present disclosure relates to the field of media services, and specifically to processing media services operations for the media service on one or more graphical processing units ("GPUs").

BACKGROUND

Devices such as smartphones and tablets are increasingly capable of supporting different types of media services. These devices may capture images and/or video and, depending upon the particulars of a given implementation, media service operations are performed on media data generated as a result of the media service. In one example, a media service is a video and/or audio service that generates a series of video and/or audio frames during a video and/or audio service. Augmented reality ("AR") manipulates the video and/or audio frames so that visual and/or audio objects represented in one or more video and/or audio frames are visually or audibly altered or so that AR objects are represented in the video and/or audio frames. A large amount of computation resources can be used to augment of the video and/or audio frames in this manner.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
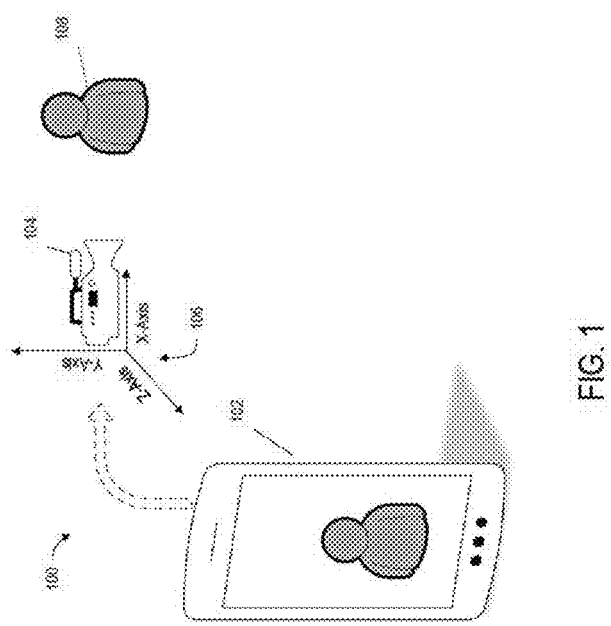
FIG. 1 illustrates a block diagram of the components of a system for capturing an image and corresponding AR data, according to various embodiments.

In the following detailed description, reference is made to the accompanying drawings, which form a part hereof wherein like numerals designate like parts throughout, and in which are shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

Call-outs for components that are present in multiples may be numbered identically, with a letter suffix distinguishing each instance of the multiple component. For example, where a component 1 is present multiple times in a figure, each instance of component 1 may be designated 1a, 1b, 1c . . . 1x. Referring to a component by its call-out without the letter, e.g. component 1, should be understood to refer to any or all instances of component 1a-1x, while reference to a specific instance of a component 1 will include its letter, e.g. component 1b.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments of computer systems for offloading media service operations to one or more graphical processing units (GPUs) are disclosed. In some embodiments, a computer system includes a first computer device, such as a media server, that provides a media service for user devices. For example, a media server is to provide a media service such as hosting a telephonic video conference for a set of two or more user devices that are to be involved in a video teleconference. To provide the media service, the first computer device provides various media service operations. However, some of these media service operations consume a large amount of processing resources. As a result, the first computer device is to offload these processing intensive media service operations to a second computer device that can directly access one or more GPUs.

The second computer device is to receive a media service request. In some embodiments, the media service request describes a configuration of the one or more GPUs and/or the media service operation(s) that the first computer device has offloaded. The second computer device then implements the media service operation(s) with one or more GPUs in the configuration indicated by the media service request. By providing one or more GPUs on computer devices that are separate from the computer devices that implement the media services, the computer devices that implement media services can use a pool of one or more GPUs that are commonly accessible via the directly attached computer devices, to implement media service operations. This lowers the cost of the GPUs since the GPUs are not dedicated to provide functionality for media service operations to any particular computer device that implements media services, which allows for the GPUs to be used more efficiently by potentially all the computer devices that are providing the media services.

FIG. 1 illustrates an example system 100 that may enable capture of an image or video that includes AR data.

System 100 may include a device 102. In the depicted embodiment of FIG. 1, device 102 is a smartphone, which may be implemented as a computer device 500, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may include one or more three-dimensional objects 108.

Camera 104 may be any camera that can provide a suitable video stream for the intended purpose of device 102. Where device 102 is implemented as a smartphone or tablet, camera 104 may be one or more built-in cameras. In other embodiments, such as where consumer device is a laptop, camera 104 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and device 102. In other embodiments, such as where consumer device 102 is equipped with multiple cameras or similar sensors, one or more of the sensors may be configured to directly detect depth points, such as a 3D camera, LIDAR, or other suitable depth-sensing technology.

Spatial position sensor 106 may be configured to provide positional information about the pose of camera 104, such as camera 104's rotation, pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera 104, including but not limited to spatial position sensors 106. In some embodiments, spatial position sensor 106 may include multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

Figure 2:
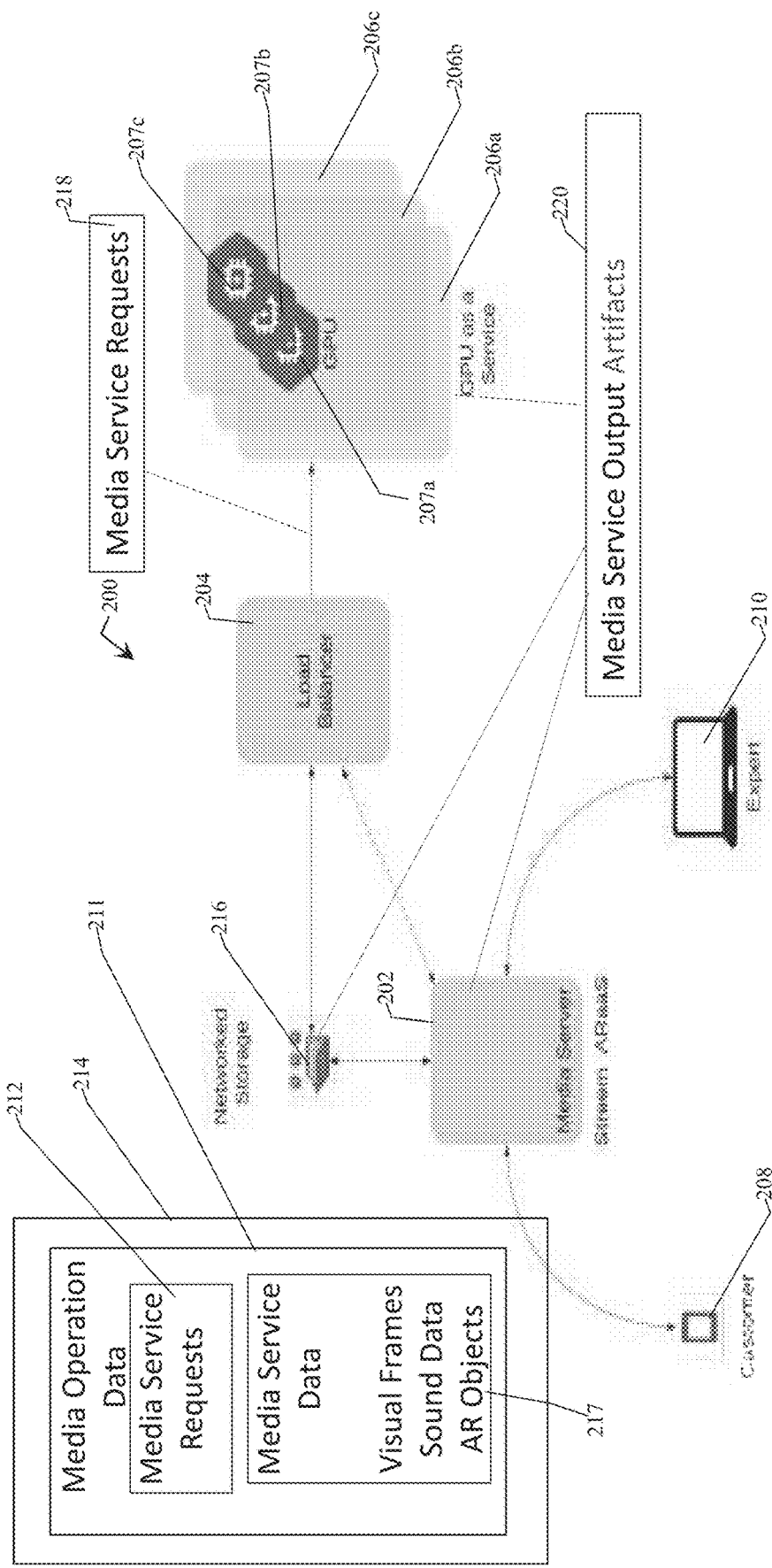
FIG. 2 is an example of a computer system that is used to implement media service operations for a media service, in accordance with some embodiments.

FIG. 2 is an example of a computer system 200 that is used to implement media service operations for a media service, in accordance with some embodiments.

Media services include, but are not limited to, video computer services (e.g., video recordings, video conferencing calls, video editing sessions), audio computer services (e.g., audio recordings, audio conferencing calls, audio editing sessions), gaming computer services (e.g., video games implemented on gaming consoles), virtual reality services ("VR" services), AR services, and/or the like. Examples of media services include realtime meshing, live PII redaction or filtering, computing annotations on the video recording, using a video recording to generate a 3d environment, and/or the like. In some embodiments, the media services described herein are Web Real-Time Communication ("WebRTC") services. WebRTC (Web Real-Time Communication) is a technology used by web applications to stream video and audio between web browsers being implemented by computer devices on a network (e.g., the internet). By using WebRTC, browser applications are provided which allow peer-to peer teleconferencing without the use of plug-ins or specialized teleconferencing applications.

The computer system 200 includes various computer devices including a media server 202, a load balancer 204, and computer devices 206a-c (generically, 206) that include corresponding GPUs 207a-c (generically, 207). In some embodiments, the media server 202 is part of a cloud that has been selected to implement a media service. The media server 202 is implementing a media service between a computer device 208, which is associated with a customer, and a computer device 210, which is associated with a service provider, such as an expert, teacher, or other person(s) relevant to the service provider and/or customer. In some embodiments, computer device 208 is an example of the system 100 described with respect to FIG. 1. In some embodiments, computer device 210 is an example of the system 100 described with respect to FIG. 1. It should be noted that the computer system 200 of FIG. 2 is a simplified diagram. In some embodiments, other computer devices and/or network devices are provided to transmit data between the media server 202, load balancer 204, and computer devices 206, 208, 210.

In one example, the media service that is implemented by the media server 202 is a video teleconferencing call. The media server 202 is thus to transmit and receive call-handling data (requests, identity, and responses) to and from the computer devices 208, 210 in order to establish the video teleconferencing call between the computer devices 208, 210. Once the video teleconferencing call is established, video frames from a video stream are exchanged between the computer devices 208, 210 through the media server 202. The media server 202 processes the video frames to administer the video conferencing call. It should be noted that processing the video frames for the video teleconferencing call includes video encoding and/or video decoding in some embodiments. Furthermore, the media server 202 receives audio data from each of the computer devices 208, 210 and synchronizes the audio data with the video frames. It should be noted that processing the audio data for the video teleconferencing call includes audio encoding and/or audio decoding in some embodiments. Media data generated as a result of the video conferencing call is referred to generically as a media artifact. In some embodiments, a media artifact refers to media assets, audio assets, metadata, and/or the like. Video data generated as a result of the video conferencing call is referred to generically as a video artifact. Audio data generated as a result of the video conferencing call is referred to generically as an audio artifact. AR data associated with the video conferencing call is referred to generically as an AR artifact. Thus, a media artifact includes one or more of a video artifact, an audio artifact, and an AR artifact.

The media server 202 is to provide media service(s) that involve implementing media service operation(s). Each media service (e.g., different video conferencing calls) implemented by the media server 202 may involve one or more different media service operations. In some embodiments, the media server 202 implements multiple media services simultaneously. For example, the media server 202 is to implement multiple video conferencing calls simultaneously. Examples of services that don't use a GPU include object masking, background blurring, text detection filters, edge detection filters on video frames, and/or the like. In other embodiments, media server 202 may implement several different media services simultaneously, for example supporting video conferencing, gaming services, and virtual reality services. Computer devices associated with other video conferencing calls are not shown in FIG. 2.

Some of these media service operations are particularly computationally intensive and cannot reasonably be handled by the processor(s) of the media server 202 without causing unacceptable interruptions in the media services. For example, some video service operations are particularly computationally intensive and cannot reasonably be handled by the processor(s) of the media server 202 without causing unacceptable interruptions in the video conferencing call. Examples of media service operations in a video conferencing call that may be handled by one or more of the GPUS 207 include generating a mesh with/without textures using depth maps, detecting model and serial number from a product label, generating a layout from a video recording of a physical space, and/or the like. Accordingly, the media server 202 offloads these computationally intensive media service operations to one or more of the GPUs 207 via one or more computer devices 206, as described below. In some embodiments, the media service operation processes a media artifact(s) to generate post process data that is not involved in the video teleconferencing call. Examples of post-process services that may be handled by the GPUs 207 include generating textures for the mesh, identifying 3D objects in the space, segmenting the mesh etc., and/or the like. Examples of data that may be generated by the post-process services include video recordings, images (including depth and color), 3D mesh data, and/or the like. In some embodiments, the media service operation processes a media artifact to generate media data that is presented during the video teleconferencing call. Examples of media services and data that are returned to a current video teleconferencing call that may be handled by the GPUs 207 include textured mesh, extracted 3D objects from the mesh, extracted metadata Esuch as make/model of the 3D object, and/or the like. One important example of a media service with media service operations that are to be handled by one or more of the GPUs is AR. During AR, AR objects are represented in the video frames. The media server 202 offloads operations such as the processing of video frames provided by the computer devices 208, 210 to the GPUs 207 so that GPUs 207 include AR object(s) to be represented in modified versions of the video frames. The modified version of the video frames with the AR objects are then sent back to the media server 202, which transmits the modified video frames to the computer devices 208, 210.

In some embodiments, the media server 202 generates media operation data 211 as a result of implementing a media service between the computer device 208 and the computer device 210. Media service data 217 is shown stored in a non-transitory computer readable storage medium 214. In some embodiments, the non-transitory computer readable storage medium 214 is provided in the media server 202. For example, the media server 202 may generate the media operation data 211 and store the media operation data 211 in the non-transitory computer readable storage medium 214 located within or directly associated with the media server 202.

In some embodiments, the non-transitory computer readable storage medium 214 is provided in a network storage device 216 (e.g., a database), which may be separate (as depicted) from media server 202. For example, the media server 202 may generate the media operation data 211 and store the media operation data 211 in the non-transitory computer readable storage medium 214 of the network storage device 216. In other embodiments, part of the media operation data 211 is stored internally by the media server 202 and part of the media operation data 211 is stored in the network storage device 216. These and other configurations would be apparent to one of ordinary skill in the art in light of this disclosure.

To offload the media service operations to the GPUs 207, the media server 202 is to transmit a media service request 212. The media operation data 211 includes the media service request 212. In some embodiments, each of the media service requests 212 identifies one or more media service operations that are to be performed with respect to the media service being provided by the media server 202 for the computer device 208 and the computer device 210. The media server 202 transmits the media service request 212 to the load balancer 204 either directly or through the network storage device 216. In other words, the load balancer 204 continually listens for media service requests that are stored in the network storage device 216, in some embodiments.

In FIG. 2, the load balancer 204 is a computer device that is separate from the media server 202 and computer devices 206, 208, 210. In other embodiments, the load balancer 204 is provided as a virtual machine implemented by the media server 202 itself. In some embodiments, a single load balancer 204 is implemented. In other embodiments, multiple load balancers (like load balancer 204) are implemented. In some embodiments, each media service request 212 describes a different media service operation that is to be implemented for a media service. In some embodiments, one or more of the media service requests 212 describe multiple media service operations to be implemented for the media service. The media operation data 211 also includes media service data 217. With respect to video teleconferencing services, the media service data 217 may include visual frames generated for the video teleconferencing service. For example, the visual frames are visual frames generated by the computer device 208 and the computer device 210 for the video teleconferencing service in some embodiments. With respect to video teleconferencing services, the media service data 217 may include audio data generated for the video teleconferencing service. For example, the audio data includes audio data generated by the computer device 208 and the computer device 210 for the video teleconferencing service, in some embodiments. With respect to video teleconferencing services, the media service data 217 may include AR data generated for the video teleconferencing service. For example, the AR data includes AR objects generated by the media server 202 for the video teleconferencing service, in some embodiments. To appropriately offload the integration of the video frames, the audio data, and/or the AR objects or to offload operations that are ancillary (not presented in the video teleconferencing call) to the video teleconferencing call, the media server 202 generates the media operation data 211 that includes the media service request 212 describing the media service operation to be performed and includes or identifies a storage location of the media service data 217 (video frames, the audio data, and/or the AR objects) that are involved in the media service operation of the media service request 212. The media server 202 then transmits the media operation data 211 either directly to the load balancer 204 or to the network storage device 216 where the load balancer 204 is to read the media operation data 211.

The load balancer 204 is to read the media service requests 212 and optimize the utilization of the GPUs 207 of the computer devices 206 so as to implement the media service operations requested by the media service requests 212 in an efficient and/or optimized manner. The computer devices 206 are separate computer devices from the load balancer 204, media server 202, and computer devices 208, 210. By separating the computer devices 206 from the media server 202, the GPUs 207 are not dedicated specifically to media server 202, which may be one of multiple media servers. Instead, the GPUs 207 are utilized by any media server (like the media server 202) to offload media service operations. In this manner, the cost of providing the media services is decreased since the computational resources of the GPUs 207 are used more efficiently, thus requiring less GPUs 207 overall to perform the same quantity of media service operations. In some embodiments, the load balancer 204 has realtime knowledge of the amount of computational related resources available on each component of a GPU service. In some embodiments, the load balancer 204 sends a new media service requests to the capable GPU 207 with the most available resources in order to distribute the load across the GPUs 207 as evenly as possible.

Accordingly, for each of the media service requests 212, the load balancer 204 is to determine a configuration of the GPUs 207 in the computer devices 206 based on the media service operations requested by the media service requests 212. The load balancer 204 is to match the media service operation from the media service request 212 to a configuration of the GPUs 207 from a plurality of different configurations for the GPUs 207. In some embodiments, the load balancer 204 performs a capabilities exchange with a GPU service dynamically including at the time of the request or using real time metadata that is retrievable via a registration or service discovery type system.

In response to the load balancer 204 selecting a configuration for the GPUs 207, the load balancer 204 transmits a media service request 218 to one or more of the computer devices 206. The media service request 218 identifies the configuration of the GPUs 207 and the media service operation to be implemented by the GPUs 207 in the computer devices 206, in the configuration specified by the media service request 218. In some embodiments, each of the computer devices 206 include a single GPU 207. In other embodiments, one or more of the computer devices 206 includes more than one GPU 207.

The media service operation requested by the media service request 218 is implemented by one or more of the GPUs 207 in accordance with the configuration indicated by the media service requests 218. The media service data 217 (i.e., an input media service artifact) related to the requested media service operation is either included in the media service request 218 or the media service request 218 identifies a storage location of the media service data 217, e.g. a specific one or several media server(s) 202 and/or network storage device(s) 216. Thus, in some embodiments, the appropriate computer devices 206 send requests to the appropriate storage device with the media service data 217 and receives the media service data 217 in response to the request. Once the appropriate computer devices 206 obtain the media service data 217 associated with the media service requests 218, the GPUs 207 implement the media service operation requested by the media service request 218 on the media service data 217 to generate media service output artifacts 220. If the media service output artifact 220 is ancillary to the media service implemented by the media server 202, the media service output artifact 220 may be stored in the network storage device 216. For example, a video recording of the video teleconference call is stored in the network storage device 216. In contrast, if the media service output artifact 220 is part of the media service being provided (modified video frames with AR object integrated therein), the media service output artifact 220 is to send the media service output artifact 220 to the media server 202, wherein the media server 202 sends the media service output artifact 220 to the computer device 208 and/or the computer device 210 for visual presentation. By offloading the media service operations, the computational resources of the media server 202 are conserved while the computational resources of the GPUs 207 are used more efficiently.

Figure 3:
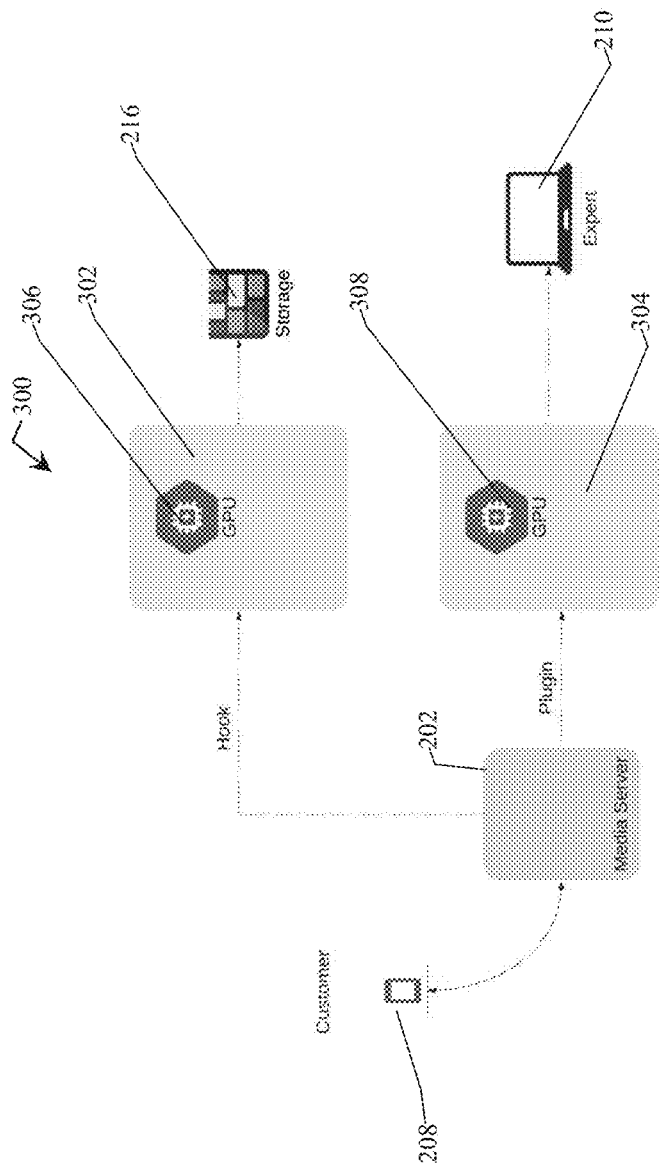
FIG. 3 is another example of a computer system that is used to implement media service operations for a media service, in accordance with some embodiments.

FIG. 3 is an example of a computer system 300 that is used to implement media service operations for a media service, in accordance with some embodiments.

The computer system 300 includes the media server 202, a computer device 302, and a computer device 304. The media server 202 is described above with respect to FIG. 2. The computer device 302 and the computer device 304 are different implementations of one of the computer devices 206 described in FIG. 2. The computer device 302 includes the GPU 306 and the computer device 304 includes the GPU 308. In some embodiments, the computer system 300 is an implementation of the computer system 200 after the load balancer 204 in FIG. 2 has selected one or more configurations for one or more media service requests 212 from the media server 202. The computer device 208 associated with the customer is receiving a media service from the media server 202.

In FIG. 3, the computer device 302 implements a hook in response to the media service request 218 (See FIG. 2) from the load balancer 204 (See FIG. 2). A hook is a software program, part of a software program, or software component that intercepts function calls or messages or events passed between software components. In this example, the hook is intercepting a media service datum or data (e.g., a video frame, audio datum, AR object) each time the media server 202 and the computer device 208 exchange a media service datum or data. The hook implemented by the computer device 302 is thus operating as a continuous loop that constantly listens for a function call related to the exchange of a media service datum or data between the media server 202 and the computer device 208. In response to detecting a function call for the exchange of a media service datum or data between the media server 202 and the computer device 208, the computer device 302 is to receive a copy of the media service datum or data (e.g., a video frame). The GPU 306 then implements a media service operation on the media service datum or data that is ancillary to the media service provided by the media server 202 to the computer device 208. The media service operation implemented by the GPU 306 generates an output media artifact. The computer device 302 then transmits the output media artifact to the network storage device 216, which stores the output media artifact. This process is repeated each time the hook detects a function call for the exchange of a media service datum or data between the media server 202 to the computer device 208.

Additionally or alternatively, the computer device 304 implements a plugin, in some embodiments, in response to the media service request 218 (See FIG. 2) from the load balancer 204 (See FIG. 2). A plugin is software program that adds specific functionality to an already existing program. In this example, the plug-in is intercepting a media service datum or data (e.g., a video frame, audio datum, AR object) each time the media server 202 and the computer device 208 exchange a media service datum or data. The plug-in adds this functionality directly into the media service being implemented by the media server 202. The plug-in receives a media service datum or data being exchanged between the media server 202 and the computer device 208. In response to receiving the media service datum or data exchanged between the media server 202 and the computer device 208, the computer device 304 is to implement a media service operation on the media service datum or data that is being processed in real-time as part of the media service provided by the media server 202 to the computer device 208 and the computer device 210. The media service operation implemented by the GPU 308 generates an output media artifact. The computer device 304 then transmits the output media artifact to the computer device 210 in real-time as part of the media service being provided by the media server 202. This process is repeated each time the plug-in receives a media service datum or data from the computer device 208. In some embodiments, the plug-in is a WebRTC filter, such as gstreamer plugin, which can provide real-time processing of video frames.

Figure 4:
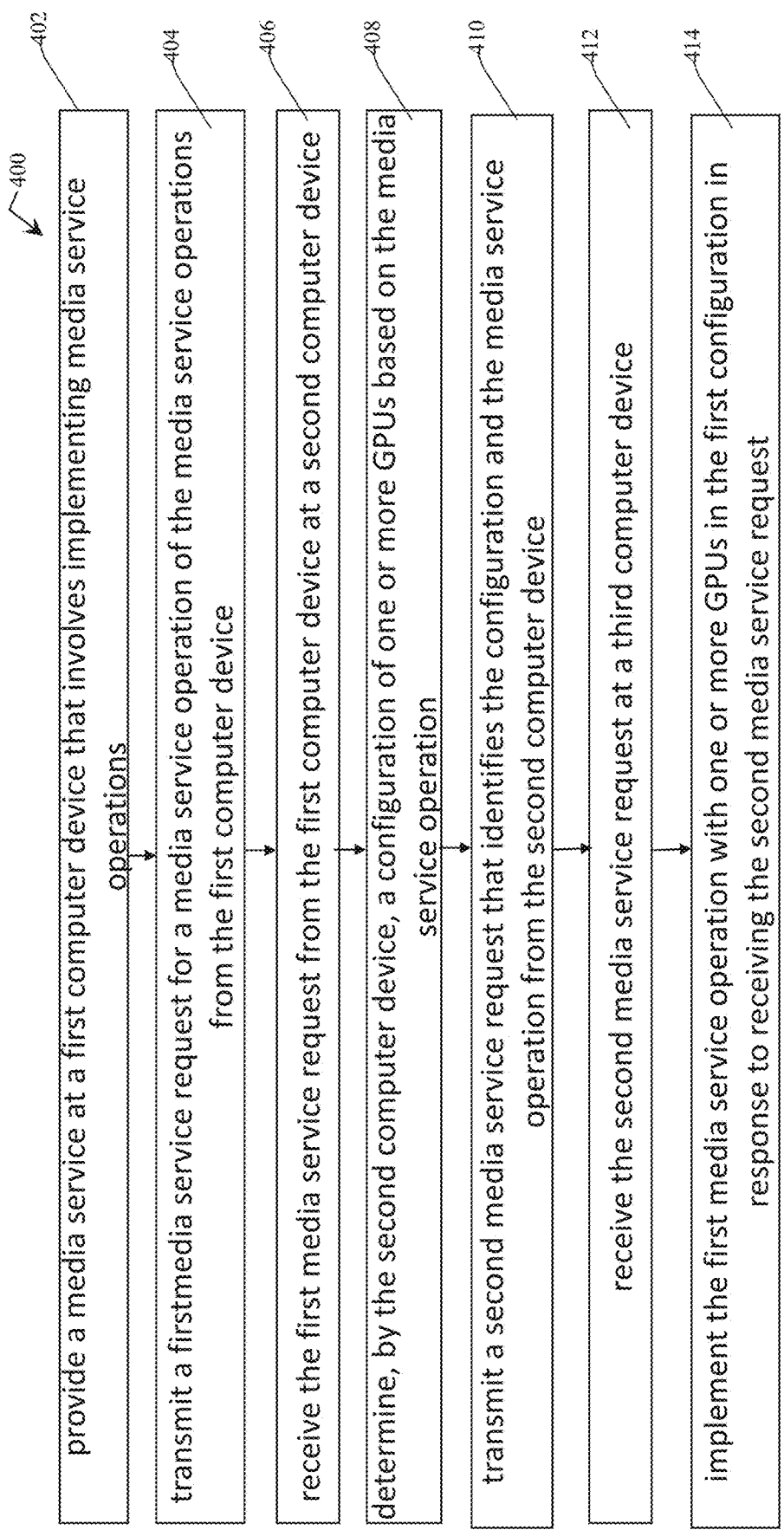
FIG. 4 depicts an example process flow, according to embodiments, for the offloading of a media service operation, in accordance with some embodiments.

FIG. 4 depicts an example process flow 400, according to embodiments, for the offloading of a media service operation, in accordance with some embodiments.

Process flow 400 may be performed in whole or in part on the computer system 200 in FIG. 2 or the computer system 300 in FIG. 3, in accordance with some embodiments. In particular, the process flow 400 may be performed on a cloud computing system, in accordance with some embodiments. Process flow 400 includes blocks 402 to 414 in the depicted example, although other implementations may add additional operations, omit some operations, and/or perform operations out of the depicted order as appropriate. The reader is referred to FIGS. 1-3 and their associated description, above, for details of how each block may be performed. Flow begins at block 402.

At block 402, a first computer device (e.g., the media server 202 in FIG. 2 and FIG. 3) provides a media service that involves implementing media service operations. In some embodiments, the media service is a video teleconferencing service. Flow then proceeds to block 404.

At block 404, the first computer device transmits a first media service request (e.g., media service request 212 in FIG. 2) for a media service operation of the media service operations. Flow then proceeds to block 406.

At block 406, a second computer device (e.g., the load balancer 204 in FIG. 2) receives the first media service request from the first computer device. Flow then proceeds to block 408.

At block 408, the second computer device determines a configuration of one or more GPUs (e.g., GPUs 207 in FIG. 2; GPUs 306, 308 in FIG. 3) based on the media service operation. In some embodiments, the second computer device matches the media service operation to the configuration from a plurality of different configurations for one or more GPUs. Flow then proceeds to block 410.

At block 410, a second media service request (e.g., media service request 218) is transmitted, wherein the second media service request identifies the configuration and the media service operation from the second computer device. Flow then proceeds to block 412.

At block 412, a third computer device (e.g., computer devices 206 in FIG. 2; computer devices 302, 304 in FIG. 3) receives the second media service request. Flow then proceeds to block 414.

At block 414, the third computer device implements the media service operation with one or more GPUs in the configuration in response to receiving the second media service request. In some embodiments, blocks 406-414 together provide an embodiment of implementing the first media service operation with one or more GPUs in response to the first computer device transmitting the first media service request for the first media service operation.

Figure 5:
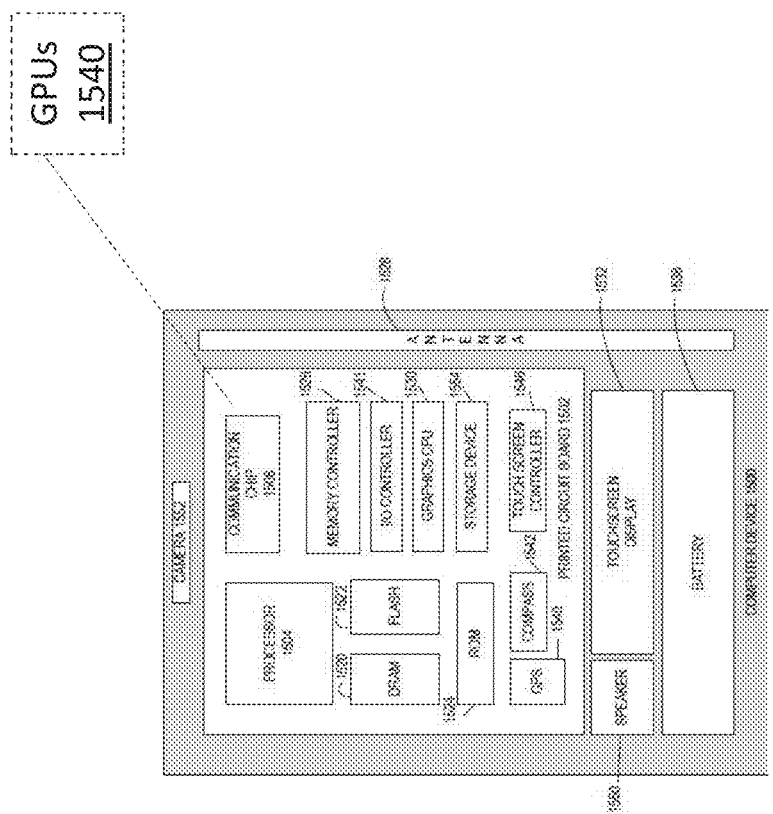
FIG. 5 is a block diagram of an example computer that can be used to implement some or all of the components of the system of FIG. 1, according to various embodiments.

FIG. 5 illustrates an example computer device 1500 that may be employed by the apparatuses and/or methods described herein, in accordance with various embodiments.

Computer devices 202, 204, 206, 208, 210, 302, 304 in FIG. 2 and FIG. 3 may each be provided in accordance with the computer device 1500 shown in FIG. 5. As shown, computer device 1500 may include a number of components, such as one or more processor(s) 1504 (one shown) and at least one communication chip 1506. In various embodiments, the one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions to enable computer device 1500, in response to execution of the programming instructions by one or more processor(s) 1504, to practice all or selected aspects of the system 100, and/or process flow 400, described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

In some embodiments, the computer device 1500 further includes one or more GPUs 1540. For example, computer devices 206, 302, 304 each include one or more GPUs 1540 while computer devices 202, 204, 208, 210 do not include GPUs.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 6:
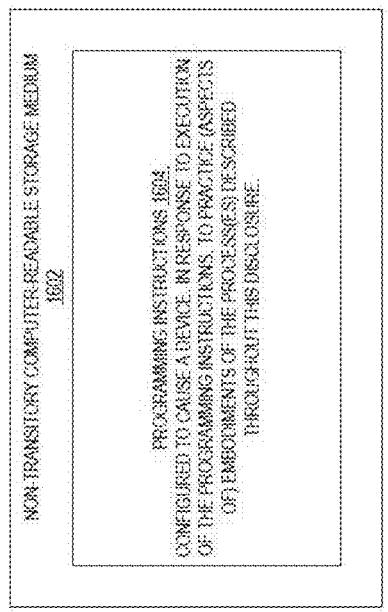
FIG. 6 is a block diagram of a computer-readable storage medium that can be used to implement some of the components of the system or methods disclosed herein, according to various embodiments.

FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be to enable a device, e.g., computer 1500, in response to execution of the programming instructions, to implement (aspects of) computer systems 200, 300 and process flow 400. In alternate embodiments, programming instructions 1604 may be disposed on multiple computer-readable non-transitory computer readable storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A computer system, comprising:
a first computer device to:
provide a media service, including a video teleconferencing call, that involves implementing media service operations between a customer computer device and a service provider computer device; and
transmit from the first computer device a first media service request for a media service operation of the media service operations, the media service operation including processing of video frames; and
a second computer device that includes one or more graphical processing units (GPUs), wherein the second computer device is to implement the media service operation of the processing of the video frames with the one or more GPUs to generate modified versions of the video frames in response to receipt of the first media service request from the first computer device, the second computer to transmit the modified versions of the video frames back to the first computer for presentation during the video teleconferencing call.

2. The computer system of claim 1, further comprising:
a third computer device to implement a load balancer, wherein the third computer device is to:
receive the first media service request from the first computer device;
determine a configuration of the one or more GPUs based on the media service operation; and
transmit to the second computer device a second media service request that identifies the configuration and the media service operation, the configuration identifying at least one of the one or more GPU s to perform the media service operation based on available resources.

3. The computer system of claim 2, wherein the second computer device is to implement the media service operation with the one or more GPUs by:
receiving the second media service request;
implement the media service operation with the identified GPUs in the configuration in response to receiving the second media service request.

4. The computer system of claim 3, wherein the third computer device is to determine the configuration of the one or more GPUs based on the media service operation by:
matching the media service operation to the configuration from a plurality of different configurations for the one or more GPUs.

5. The computer system of claim 1, wherein the second computer device is to implement the media service operation with the one or more GPUs by:
receiving a media artifact related to the media service;
implementing the media service operation on the media artifact;
storing the media artifact in response to implementing the media service operation on the media artifact.

6. The computer system of claim 1, wherein the second computer device is to implement the media service operation with the one or more GPUs by:
receiving a media artifact related to the media service;
implementing the media service operation on the media artifact;
transmitting the media artifact to the media service of the first computer device in response to implementing the media service operation on the media artifact.

7. A method of processing data, comprising:
providing, on a first computer device, a media service, including a video teleconferencing call, that involves implementing media service operations between a customer computer device and a service provider computer device;

transmitting from the first computer device a first media service request for a media service operation of the media service operations with the first computer device, the media service operation including processing of video frames;

implementing the media service operation of the processing of the video frames with one or more graphical processing units (GPUs) included in a second computer device to generate modified versions of the video frames in response to receipt of the media service request from the first computer device; and transmitting the modified versions of the video frames from the second computer back to the first computer for presentation during the video teleconferencing call.

8. The method of claim 7, further comprising:
receiving, at a third computer device that implements a load balancer, the first media service request from the first computer device;

determining, with the load balancer of the third computer device, a first configuration of the one or more graphical processing units (GPUs) based on the media service operation; and transmitting a second media service request that identifies the first configuration and the media service operation from the third computer device to the second computer device, the first configuration identifying at least one of the one or more GPU s to perform the media service operation based on available resources.

9. The method of claim 8, wherein implementing the media service operation with the one or more GPUs comprises:
receiving the second media service request at the second computer device;

implementing the media service operation with the identified one or more-GPUs in the first configuration in response to the second computer device receiving the second media service request.

10. The method of claim 9, wherein determining the first configuration of the one or more GPUs based on the media service operation comprises:
matching the media service operation to the first configuration from a plurality of different configurations for the one or more GPUs.

11. The method of claim 7, wherein implementing the media service operation with the one or more GPUs comprises:
receiving a media artifact related to the media service;
implementing the media service operation on the media artifact;
storing the media artifact in response to implementing the media service operation on the media artifact.

12. The method of claim 7, wherein implementing the media service operation with the one or more GPUs comprises:
receiving a media artifact related to the media service;
implementing the media service operation on the media artifact;
transmitting the media artifact to the media service of the first computer device in response to implementing the media service operation on the media artifact.

13. A non-transitory computer readable medium (CRM) that stores computer executable instructions that, in response to being executed by at least one processor of an apparatus, to cause the apparatus to:

provide, on a first computer device, a media service, including a video teleconferencing call, that involves implementing media service operations between a customer computer device and a service provider computer device;

transmit from the first computer device a first media service request for a media service operation of the media service operations, the media service operation including processing of video frames;

implement the media service operation of the processing of the video frames with one or more graphical processing units (GPUs) to generate modified versions of the video frames included in a second computer device receipt of the first media service request from the first computer device, the second computer to transmit the modified versions of the video frames back to the first computer for presentation during the video teleconferencing call.

14. The non-transitory CRM of claim 13, wherein the instructions are to further cause the apparatus to:
receive, at a third computer device that implements a load balancer, a first media service request from the first computer device, wherein the media service request is the first media service request;

determine, with the load balancer of the third computer device, a first configuration of the one or more graphical processing units GPUs based on the media service operation; and transmit to the second computer device a second media service request that identifies the first configuration and the first media service operation from the third computer device to the second computer device, the configuration identifying at least one of the one or more GPU s to perform the media service operation based on available resources.

15. The non-transitory CRM of claim 14, wherein the instructions are to further cause the apparatus to implement the first media service operation with the one or more GPUs by:
receiving the second media service request at the second computer device;
implementing the media service operation with the identified GPUs in the first configuration in response to the second computer device receiving the second media service request.

16. The non-transitory CRM of claim 15, wherein the instructions are to further cause the apparatus to determine the first configuration of the one or more GPUs based on the media service operation by:
matching the media service operation to the first configuration from a plurality of different configurations for the one or more GPUs.

17. The non-transitory CRM of claim 13, wherein the instructions are to further cause the apparatus to implement the first media service operation with the one or more GPUs by:
receiving a media artifact related to the media service;
implementing the media service operation on the media artifact;
storing the media artifact in response to implementing the media service operation on the media artifact.

18. The non-transitory CRM of claim 13, wherein the instructions are to further cause the apparatus to implement the first media service operation with the one or more GPUs by:

receiving a media artifact related to the media service;

implementing the media service operation on the media artifact;

transmitting the media artifact to the media service of the first computer device in response to implementing the media service operation on the media artifact.

19. The computer system of claim 1, wherein the media service operation of the processing of the video frames in the video teleconferencing call includes generating a mesh using a depth map, generating textures for the mesh, identifying 3D objects, generating a layout from a video recording of a physical space, or any combination thereof.

* * * * *